United States Patent
Jutamulia

(10) Patent No.: US 7,336,896 B2
(45) Date of Patent: Feb. 26, 2008

(54) DISPLAY MAGNIFIER FOR DIGITAL CAMERA

(76) Inventor: Suganda Jutamulia, 2108 Jefferson Ave., Berkeley, CA (US) 94703

( * ) Notice: Subject to any disclaimer, the term of this patent is extended or adjusted under 35 U.S.C. 154(b) by 378 days.

(21) Appl. No.: 11/088,087

(22) Filed: Mar. 22, 2005

(65) Prior Publication Data

US 2006/0216024 A1  Sep. 28, 2006

(51) Int. Cl.
*G03B 17/18* (2006.01)
*G03B 17/56* (2006.01)
*G02B 27/02* (2006.01)

(52) U.S. Cl. .................. 396/287; 396/429; 348/333.08; 348/375; 359/802

(58) Field of Classification Search ............... 396/281, 396/287, 374, 429, 544; 348/333.08, 333.12, 348/375; 359/802, 803, 811
See application file for complete search history.

(56) References Cited

U.S. PATENT DOCUMENTS

| | | | |
|---|---|---|---|
| 4,443,819 A | 4/1984 | Funada et al. | |
| 4,991,935 A | 2/1991 | Sakurai | |
| 5,075,799 A | 12/1991 | Pine et al. | |
| 5,119,239 A | 6/1992 | Iaquinto et al. | |
| 5,307,209 A | 4/1994 | Iaquinto et al. | |
| 5,862,428 A * | 1/1999 | An .......................... 396/544 | |
| 5,926,315 A * | 7/1999 | McBride ..................... 359/534 | |
| 6,067,459 A | 5/2000 | Lincoln et al. | |
| 6,222,686 B1 | 4/2001 | Richard | |
| 6,307,686 B1 * | 10/2001 | Ferraro ....................... 359/802 | |
| 6,453,125 B2 * | 9/2002 | Shono ........................ 396/287 | |
| 6,597,523 B2 * | 7/2003 | Giampavolo et al. ....... 359/802 | |
| 6,924,950 B2 * | 8/2005 | Gventer et al. ............. 359/802 | |
| 2004/0212822 A1 | 10/2004 | Schinner | |
| 2006/0082682 A1 * | 4/2006 | Schmidt ..................... 348/375 | |
| 2006/0109364 A1 * | 5/2006 | Sun ........................ 348/333.06 | |
| 2006/0171045 A1 * | 8/2006 | Carnevali ................... 359/802 | |

OTHER PUBLICATIONS

E. Hecht, Optics, 4th Ed., 2002, pp. 210-212, Addison-Wesley, San Francisco.
Screen-Shade, Burbank, California, Product Description, 2005, www.screen-shade.com.
Hoodman Corp., Torrance, California, Product Description, 2005, www.hoodmanusa.com.

\* cited by examiner

*Primary Examiner*—W. B. Perkey

(57) ABSTRACT

A display magnifier for digital cameras is removably mounted to a camera using a screw tightened into a standard threaded tripod hole under the camera. A photographer views the display through the magnifier. When it is not in use, the magnifier can be folded for saving storage space and ease in carrying. The magnifier will not only magnify but also brighten since the magnifying lens will collect more light than the naked eye. Additionally, the screw may have a threaded hole in its head to allow the tripod screw to mate with it.

17 Claims, 5 Drawing Sheets

DISPLAY MAGNIFIER FOR DIGITAL CAMERA

CROSS-REFERENCE TO RELATED APPLICATION

Not applicable.

BACKGROUND

1. Field of Invention

This invention relates to digital cameras, specifically to a magnifier to magnify the liquid crystal display of a digital camera.

2. Description of Prior Art

Recently, digital cameras become increasingly popular and are widely used replacing traditional 35 mm film cameras for taking pictures. A digital camera has a liquid crystal display that can show pictures stored in the camera. The display is primarily used as a view finder to show the view that will be taken by the camera. In contrast to video game apparatus or other computer related apparatus (e.g., laptop computers, DVD players, etc.), where liquid crystal displays are getting larger as their manufacturing cost goes down, liquid crystal displays in digital cameras cannot be made larger, because digital cameras must be compact. The diagonal size of liquid crystal display in a digital camera is normally about 38.1-63.5 mm (1.5"-2.5"). It is difficult to see details in the view shown in a small display, especially for aged people. Although most cameras have zoom feature for the display mode, it is useful only for viewing pictures already taken and stored in the camera.

To take a good and satisfying picture, a photographer must be able to see sufficient details in the view before he or she presses the shutter button. It is, of course, impossible to use the zoom feature, since the action to be photographed will be over and the related view will be missed if the view is seen using the zoom feature.

A solution to the aforementioned problem is to use an optical magnifier. Screen-Shade, Burbank, Calif. (www.screen-shade.com) (2005), markets a screen shade with a polycarbonate magnifier to cover the liquid crystal display of a digital camera or a video camera. The screen shade is mounted to the camera using self-stick hook-and-loop (Velcro) strips around the display. The maximum magnification is 2×. On the other hand, Hoodman Corp., Torrance, Calif. (www.hoodmanusa.com) (2005), markets a hood with a 2× magnifier for digital or video cameras. The hood is mounted over the display using a strap.

The drawbacks of these products are:
1. The self-stick hook-and-loop strips may leave stickum on the body of camera, which is hard to clean. Depending upon the camera model, there may be no sufficient space for sticking the hook-and-loop strips around the display.
2. While the strap of the hood may be good for video cameras, it will not work well with digital cameras, since the strap may block the camera lens, if the display is behind the camera lens.
3. The screen shade and hood extending from the display may obstruct the operation of the camera.
4. To get higher magnification (i.e., larger than 2×), the magnifier must be placed further away from the display. The hook-and-loop strips and the mounting strap are not strong enough to hold a lens far from the camera body.

A method for magnifying the display of a digital camera, which is applied to a printer, is disclosed in US Patent Application Publication No. US 2004/0212822 to Schinner. The camera is inserted into a docking station that holds a magnifying lens. The docking station is directly connected or connected by a cable to a printer. The drawbacks of this method are:
1. The magnifying lens is not mounted on the camera but is mounted on a docking station, which is bulky and heavy as compared with a digital camera.
2. The docking station is a complex system that requires a multi-pin connector to connect to the camera.
3. The magnifying lens is used only for previewing photographs, and practically cannot be used for taking a picture.

Other magnifier mounting mechanisms have been disclosed in US patents: U.S. Pat. No. 4,443,819 (1984) to Funada et al. for a pocket TV; U.S. Pat. No. 5,075,799 (1991) to Pine et al. for a pager; U.S. Pat. No. 4,991,935 (1991) to Sakurai, and U.S. Pat. Nos. 5,119,239 (1992) and 5,307,209 (1994) to Iaquinto et al., all for a video game player, U.S. Pat. No. 6,067,459 (2000) to Lincoln et al. and U.S. Pat. No. 6,222,686 (2001) to Richard, both for a cell phone. However, none can be used with a digital camera.

To summarize, the prior art fails to teach any magnifier that can magnify the liquid crystal display of a digital camera, that can be easily but securely and removably mounted on the camera, that will not obstruct the operation of the camera, or that is inexpensive and can be universally mounted to most digital cameras, regardless of their makers and models.

OBJECTS AND ADVANTAGES

Accordingly, several objects and advantages of the present invention are:
1. to provide an improved magnifier for the liquid crystal display of a digital camera;
2. to provide such a device that can be easily, securely, and removably mounted to the camera;
3. to provide such a device that can be used without obstructing the operation of camera; and
4. to provide such a device that can be universally mounted to most digital cameras regardless of their makers and models.

Other objects and advantages are:
1. to provide such a device that not only magnifies an image but also brightens the image of the display;
2. to provide such a device that can be folded to make it compact when it is not in use;
3. to provide such a device that reduces the effect of ambient light.

Further objects and advantages are to provide a magnifier for the display of a digital camera, which is simple to use and maintain, and which is inexpensive to manufacture. Still further objects and advantages will become apparent from a consideration of the ensuing description and drawings.

SUMMARY

In accordance with the invention, a magnifier magnifies the liquid crystal display of a digital camera of the type having threaded hole for mating with a mounting screw of a tripod. The magnifier can be universally mounted to most digital cameras using their threaded tripod holes. Furthermore, the magnifier can be folded to save storage space and make it easy to carry when it is not in use.

DRAWING FIGURES

Figure 1:
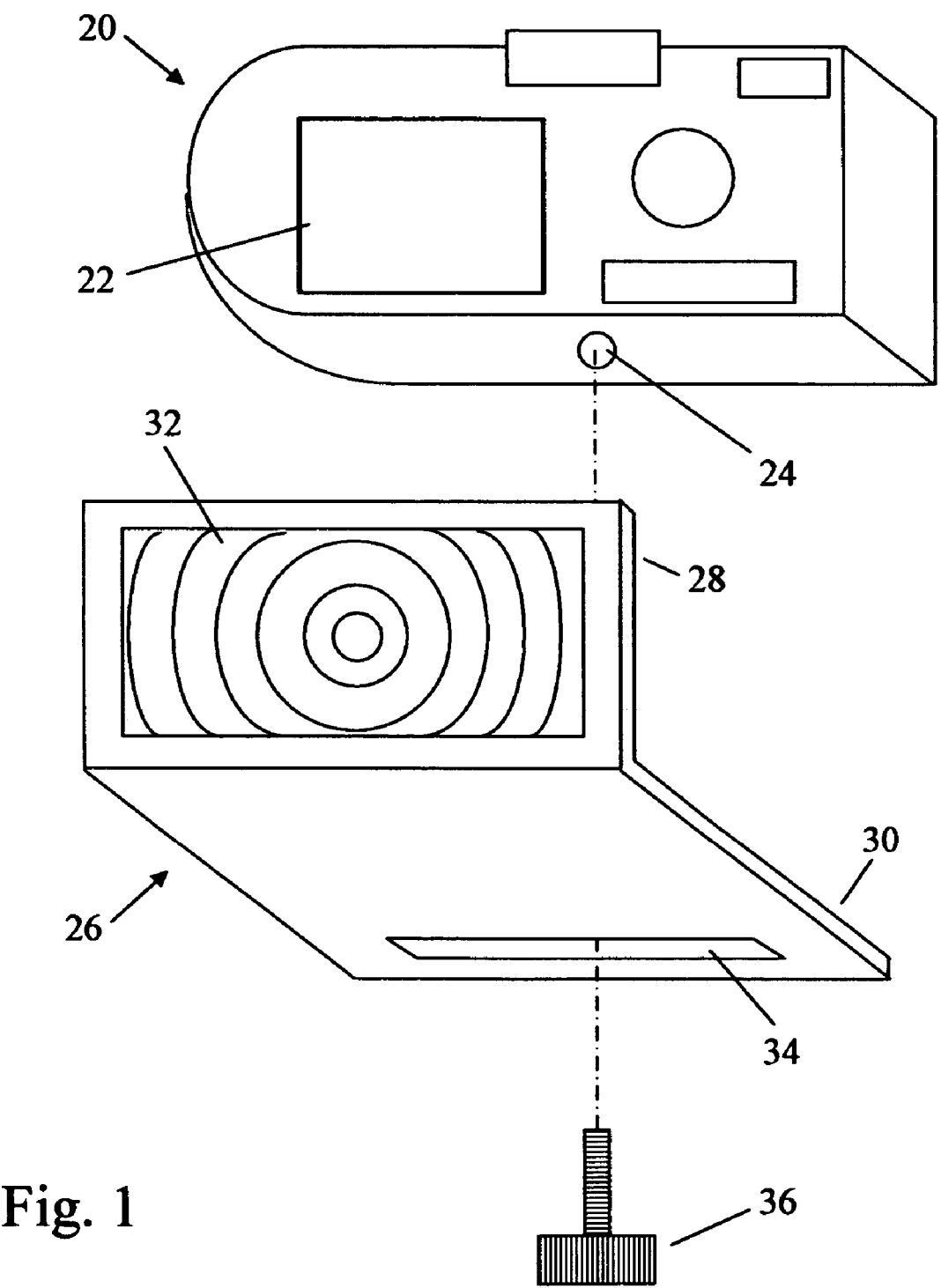
FIG. 1 shows a preferred embodiment of the display magnifier universally mountable on most digital cameras in accordance with the invention.

REFERENCE NUMERALS IN DRAWINGS 20 digital camera
22 liquid crystal display
24 threaded tripod hole
26 display magnifier
28 lens holder
30 bottom plate
32 magnifying lens
34 through hole
36 thumb screw
38 front bottom plate
40 rear bottom plate
42 shade FIG. 1—Description and Operation FIG. 1 shows a preferred embodiment of a display magnifier for digital camera in accordance with the invention. A display magnifier 26 comprises a magnifying lens 32 and its mounting means, including a lens holder 28 and a bottom plate 30. Magnifier 26 is removably mounted to a digital camera 20 of the type having a threaded tripod hole 24 for mating with a mounting screw (not shown) of a tripod, using a knurled-head thumb screw 36. Magnifying lens 32 is mounted on lens holder 28, which is perpendicularly connected to bottom plate 30, forming an "L-shape" structure. Lens 32 can be a glass lens, a plastic lens, a Fresnel lens, or any other magnifying means. Bottom plate 30 has an elongated through hole 34. Screw 36 is arranged to extend through hole 34 and mate with threaded tripod hole 24. Plate 30 is removably fixed to camera 20 by tightening screw 36 into hole 24.

Hole 34 has an elongated shape parallel to the camera body to make magnifier 26 compatible universally with most digital cameras. Each digital camera has different position for tripod hole 24 under its body. Hole 34 will fit any position over hole 24.

Lens 32 is a positive lens. To increase its magnifying power and reduce aberrations, complex compound lenses can be used (E. Hecht, Optics, $4^{th}$ Ed., Addison-Wesley, San Francisco (2002), pp. 210-212). To get an erect and magnified image, the distance of lens 32 to display 22 must be shorter than the focal length of lens 32.

If the focal length of lens 32 is short, the size of lens 32 will be accordingly small. When display 22 is placed at a distance less than the focal length from lens 32, only limited area of display 22 can be seen through lens 32. To view entire display 22 through lens 32, the size of lens 32 must be sufficiently large, which requires a longer focal length. This will, in turn, require a greater distance between display 22 and lens 32. A larger space between lens 32 and camera 20 is actually desirable, so that lens 32 will not obstruct the operation of the camera. In other words, a photographer's hands can freely operate the camera in the space between lens 32 and camera 20.

Because lens 32 is much larger than the eye, the lens collects significantly more light than the eye. Thus display 22 is not only magnified, but it is also brighter, when looked through lens 32.

Figure 2:
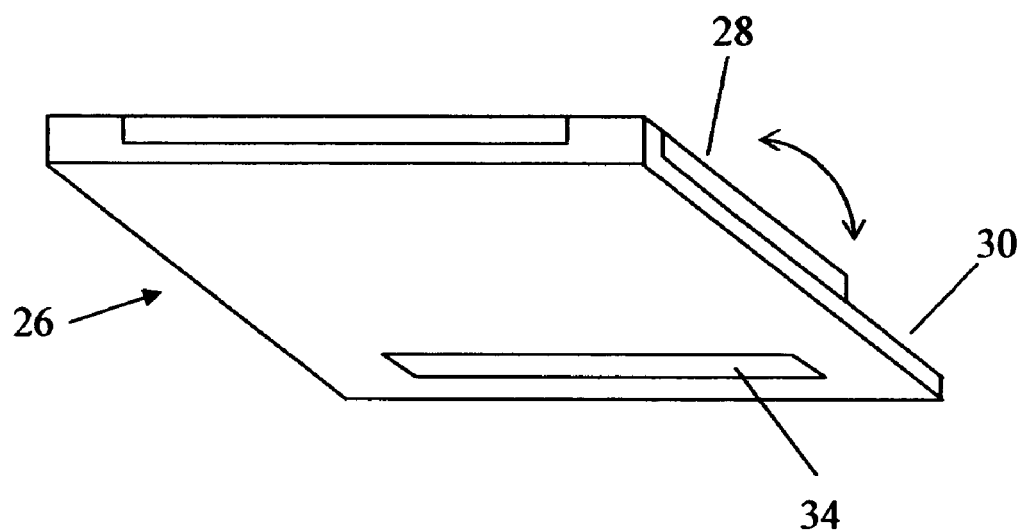
FIG. 2 shows another preferred embodiment of the magnifier, which can be folded once, in accordance with the invention.

FIG. 2—Description and Operation

FIG. 2 shows another preferred embodiment of the magnifier in accordance with the invention. For saving the storage space and thus making it easy to carry, when magnifier 26 is not in use, lens holder 28 is hinged to plate 30 so that holder 28 and plate 30 can be folded together, as indicated by the curved arrow. Accordingly, magnifier 26 becomes flat after one fold when not in use.

Figure 3:
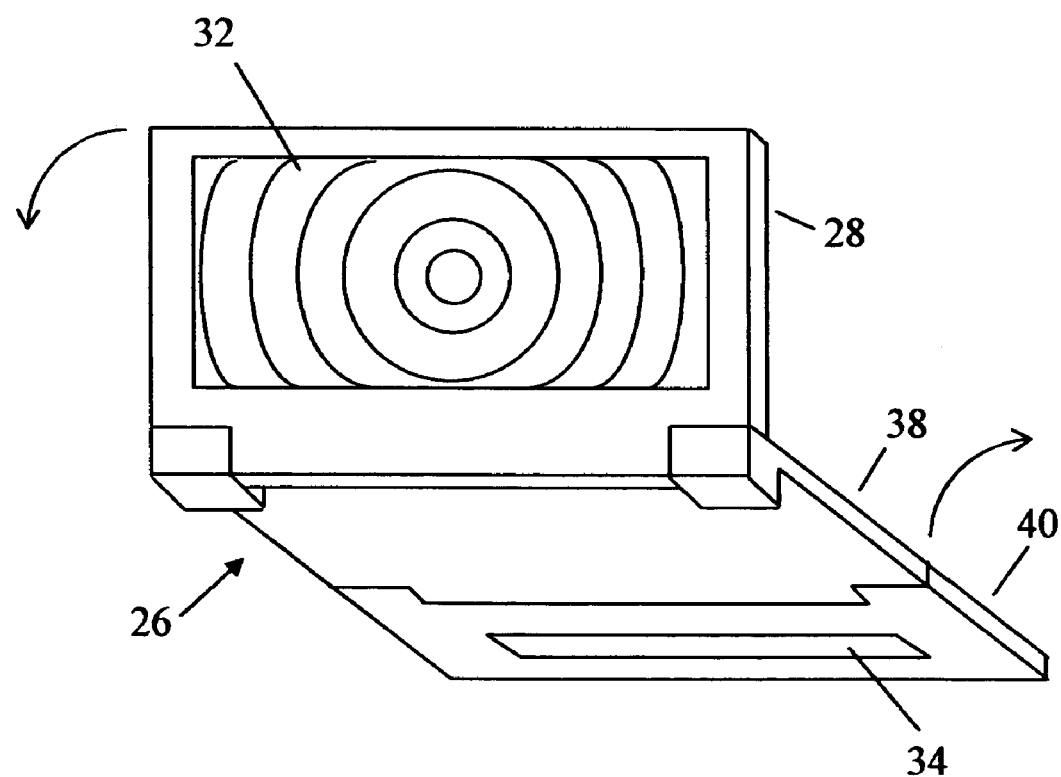
FIG. 3 shows still another preferred embodiment of the magnifier, which can be folded twice, in accordance with the invention.
Figure 4:
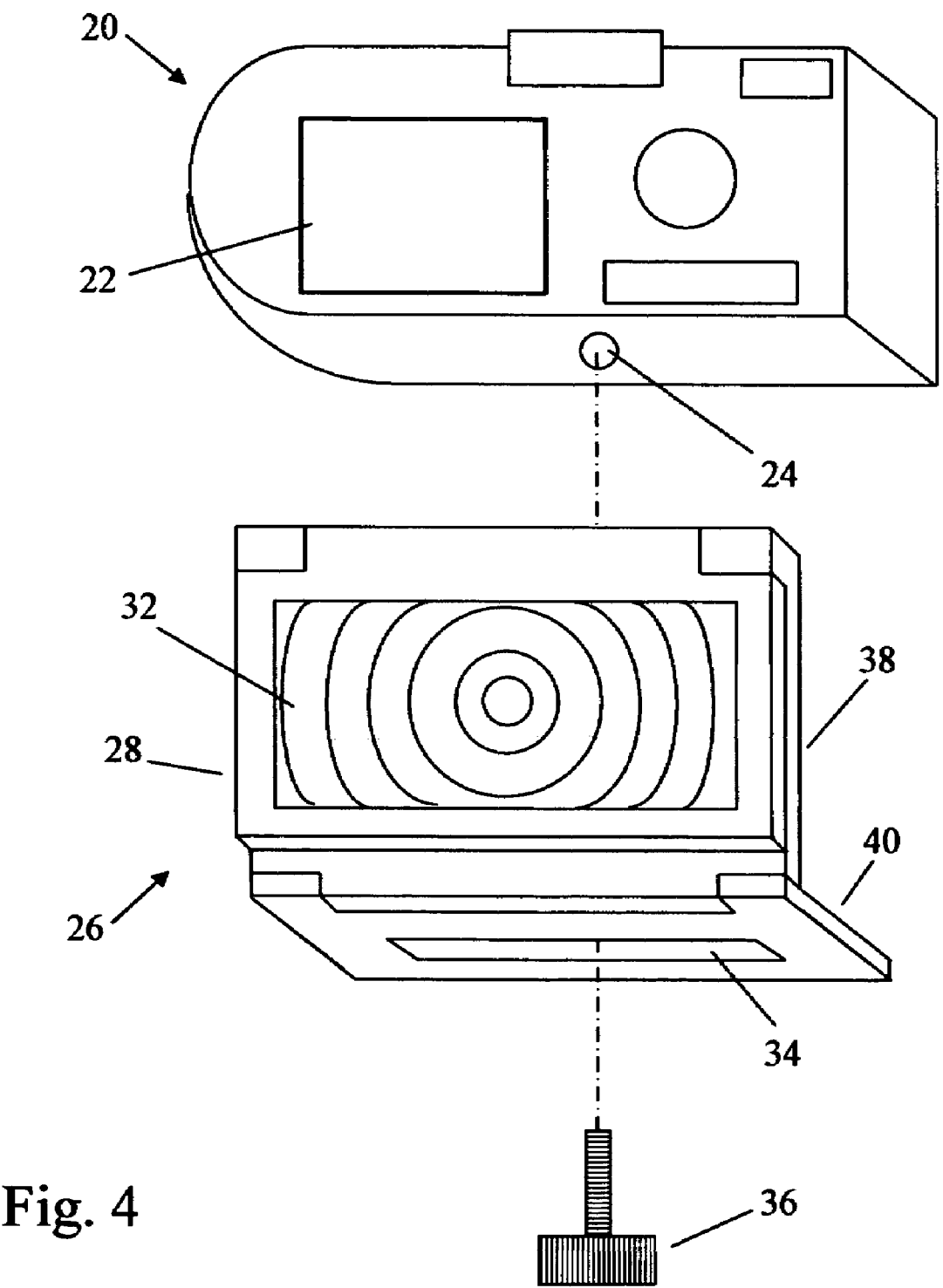
FIG. 4 shows the magnifier of FIG. 3 mounted to a digital camera.

FIGS. 3 and 4—Description and Operation

FIG. 3 shows still another preferred embodiment of the magnifier in accordance with the invention. For the same reason of saving the storage space and being easy to carry, when magnifier 26 is not in use, lens holder 28 is hinged so it can be folded to touch a front bottom plate 38 as indicated by the left curved arrow. Then plate 38, which is hinged to a rear bottom plate 40, together with lens holder 28 are folded 90 degrees as indicated by the right curved arrow, making them perpendicular to plate 40. Accordingly, magnifier 26 is back to its original "L-shape" but it is now very close to camera 20 as shown in FIG. 4. Thus, when magnifier 26 is not in use, it can still be mounted on the camera body. The mounted magnifier 26 does not make camera 20 bulky, because magnifier 26 has been folded twice and very close to camera 20.

Figure 5:
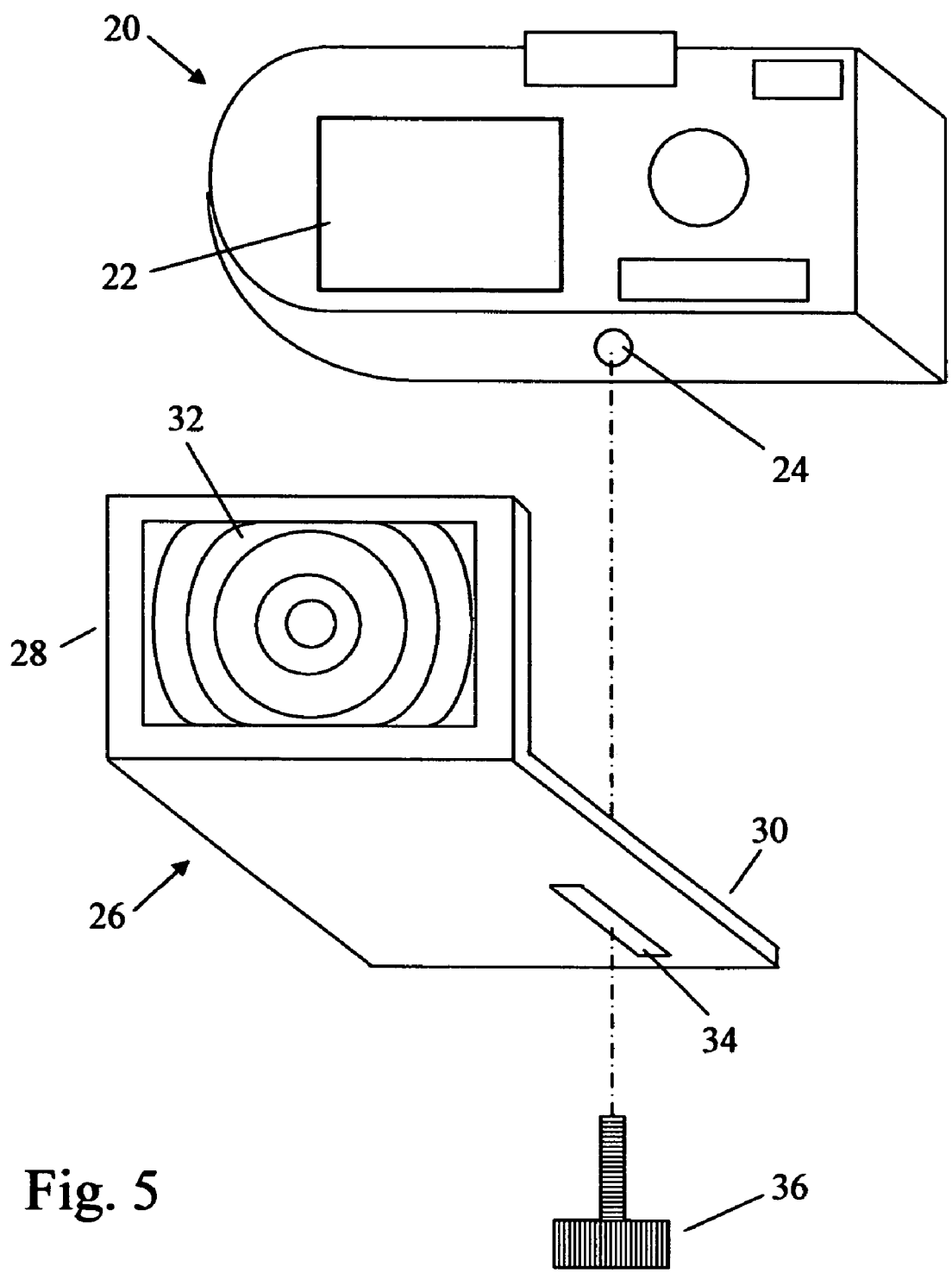
FIG. 5 shows a preferred embodiment of the display magnifier for a specific digital camera in accordance with the invention.

FIG. 5—Description and Operation

FIG. 5 shows a preferred embodiment of a magnifier for a specific digital camera in accordance with the invention. Assume that digital camera 20 is a specific model for which the size and position of display 22, and the position of hole 24 are known. In this case, magnifier 26 can be designed appropriately to make it as compact as possible. The position and size of lens 32 can match the position and size of display 22. The position of through hole 34 can match the position of hole 24. Furthermore, through hole 34 can be perpendicular to camera 20. Thus, magnifier 26 can be shifted backward and forward to adjust the magnification. Hole 34 can also be simply a round hole (not shown). Similarly, magnifier 26 can have a one-fold capability as shown in FIG. 2, or a two-fold capability as shown in FIGS. 3 and 4, although it is not shown in the figure.

Figure 6:
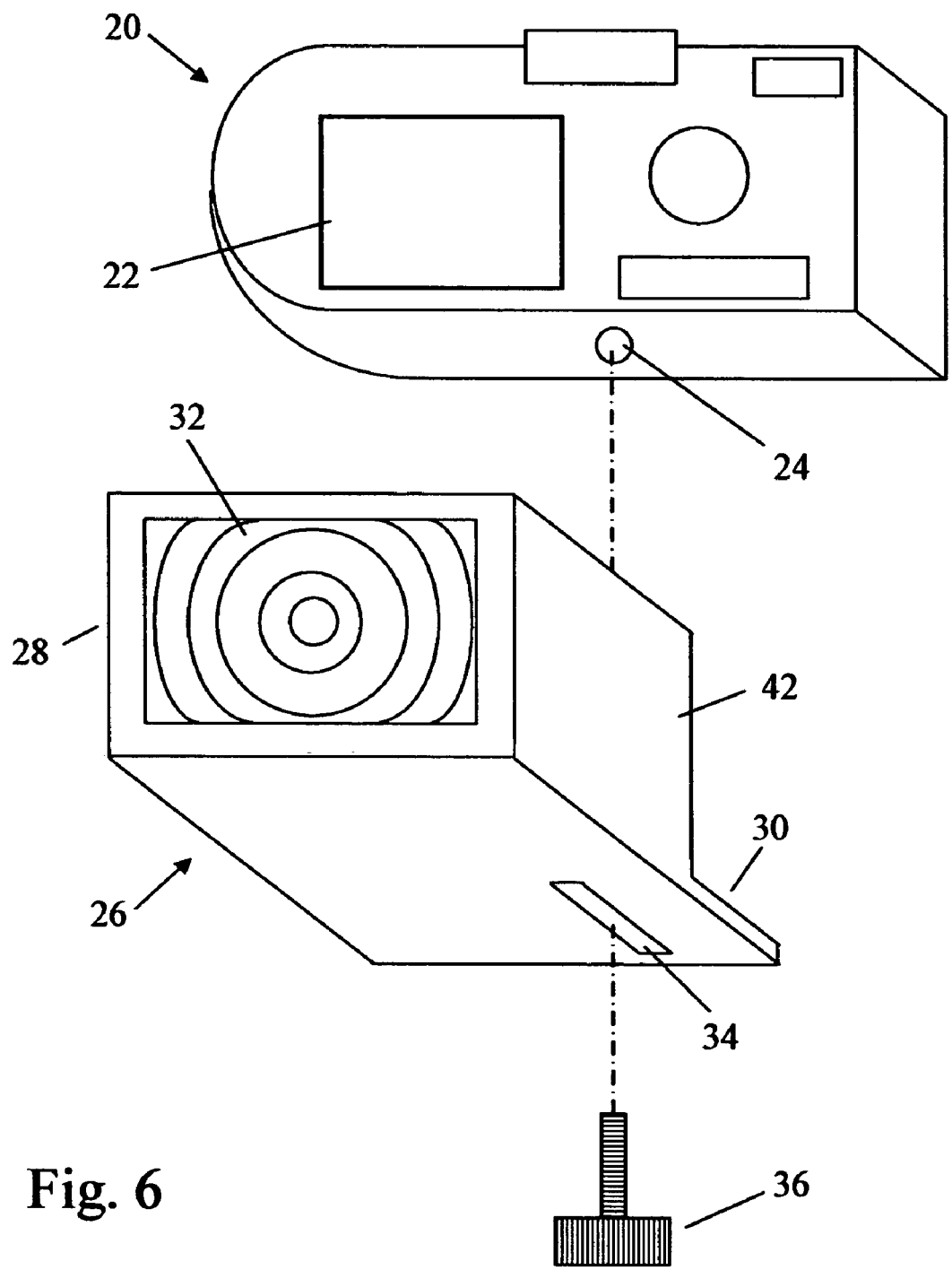
FIG. 6 shows the magnifier of FIG. 5 with added shades to reduce ambient light at the display.

FIG. 6—Description and Operation

FIG. 6 shows another preferred embodiment of the magnifier for a specific digital camera in accordance with the invention. To reduce the ambient light at the display, display 22 can be surrounded by shades, which are mounted to magnifier 26 of FIG. 5. Magnifier 26 with additional shades at three sides is shown in FIG. 6. Magnifier 26 can be made capable of folding by providing hinges (not shown), so that the left side shade (not shown), the top shade (not shown) and the right side shade 42 can be folded in. Similarly, the shades can be applied to magnifier 26 of FIGS. 1 and 4, although it is not shown in these figures.

CONCLUSION, RAMIFICATIONS, AND SCOPE

Accordingly, the reader will see that the magnifier can be mounted on the body of a digital camera using a screw tightened into the standard threaded tripod hole under the camera to magnify the liquid crystal display of the camera. The magnifier is placed at a distance from the camera, such that it will not obstruct the operation of the camera. In other words, the photographer's hands can freely operate the camera between the magnifier and the camera. An elongated through hole in the magnifier make it possible to mount the magnifier universally to most digital cameras. Furthermore, the magnifier can be folded one time or a plurality of times for saving the storage space and ease in carrying. For reducing ambient light at the display, shades can be added to the magnifier to surround the display. To allow the use of a tripod after the magnifier is mounted on the camera, a special screw, which has a threaded hole in its head can be used.

Although the description above contains many specificities, these should not be construed as limiting the scope of the invention but as merely providing illustrations of some of the presently preferred embodiments of this invention. Other preferred embodiments are possible, including:

- liquid crystal display can be other types of display such as a plasma display;
- magnifying lens 32 can be antireflection (AR) coated;
- bottom plate 30 in FIGS. 1, 5, and 6 can be replaced with a telescopic bar;
- bottom plate 30 in FIGS. 1, 5, and 6 can be replaced with an accordion-type structure similar to an accordion-type gate.

Furthermore, one skilled in the art will be aware of a variety of means for mounting the magnifier on the camera using the threaded tripod hole under the camera. Thus the scope of the invention should be determined by the appended claims and their legal equivalents, rather than by examples given.

The invention claimed is:

1. An apparatus for magnifying a display of a digital camera of the type having threaded hole for mating with a mounting screw of a tripod, comprising:
   (a) a magnifying means for magnifying said display of a camera;
   (b) a mounting means for mounting said magnifying means, said mounting means having a through hole; and
   (c) a screw for removably mounting said mounting means to said camera, said screw being arranged to extend through said through hole and mate with said threaded hole of said camera;
   whereby said magnifying means will magnify said display of said camera and will not obstruct the operation of said camera.

2. The apparatus of claim 1 wherein said display is a liquid crystal or plasma display.

3. The apparatus of claim 1 wherein said magnifying means is a glass, plastic, Fresnel, or compound lens.

4. The apparatus of claim 1 wherein said magnifying means is antireflection coated.

5. The apparatus of claim 1 wherein said mounting means is hinged so that it can be folded one time or a plurality of times.

6. The apparatus of claim 1 wherein said mounting means comprises a telescopic bar or an accordion-type structure.

7. The apparatus of claim 1 wherein said through hole of said mounting means is elongated or round.

8. The apparatus of claim 7 wherein said elongated through hole is parallel or perpendicular to said camera.

9. The apparatus of claim 1, further including a plurality of additional shades surrounding said display.

10. The apparatus of claim 9 wherein said shades are hinged so that they can be folded.

11. The apparatus of claim 1 wherein said screw is a thumb screw or a screw having a head with a threaded hole in said head.

12. A method for magnifying a display of a digital camera of the type having threaded hole for mating with a mounting screw of a tripod, comprising:
   (a) providing a magnifying means for magnifying said display of a camera;
   (b) providing a mounting means for mounting said magnifying means, said mounting means having a through hole;
   (c) providing a screw arranged to extend through said through hole and mate with said threaded hole of said camera; and
   (d) removably mounting said mounting means to said camera by tightening said screw into said threaded hole of said camera;
   whereby said magnifying means magnify said display of said camera and will not obstruct the operation of said camera.

13. The method of claim 12 wherein said magnifying means is a glass, plastic, Fresnel, or compound lens.

14. The method of claim 12 wherein said mounting means is hinged so that it can be folded one time or a plurality of times.

15. The method of claim 12 wherein said mounting means comprises a telescopic bar or an accordion-type structure.

16. The method of claim 12 wherein said through hole of said mounting means is elongated or round.

17. The method of claim 12 wherein said screw is a thumb screw or a screw having a head with a threaded hole in said head.

* * * * *